W. E. TULLAR.
CONTROLLING MEANS FOR MOTOR DRIVEN VEHICLES.
APPLICATION FILED SEPT. 28, 1914.
1,209,782.
Patented Dec. 26, 1916.
4 SHEETS—SHEET 1.
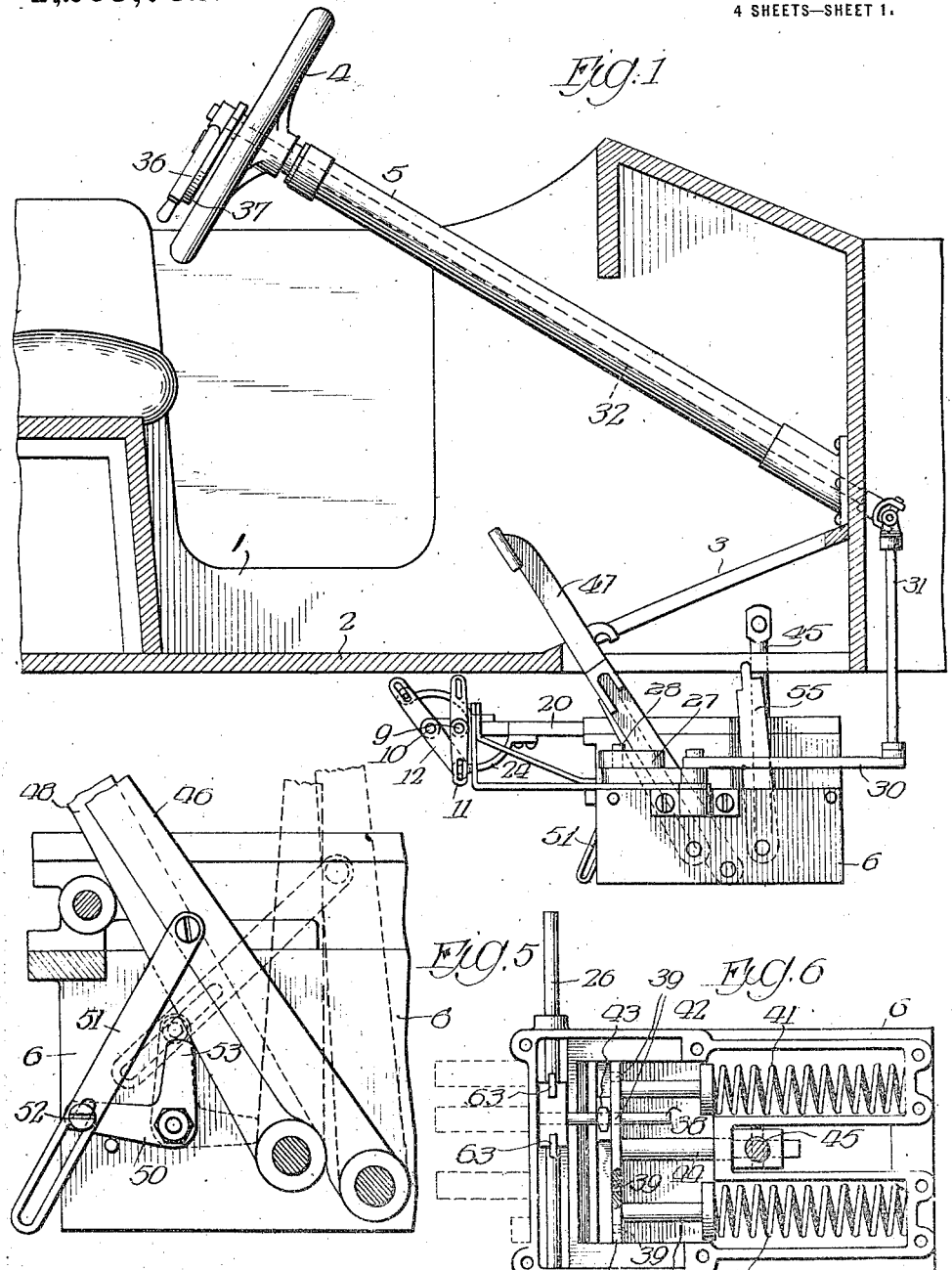

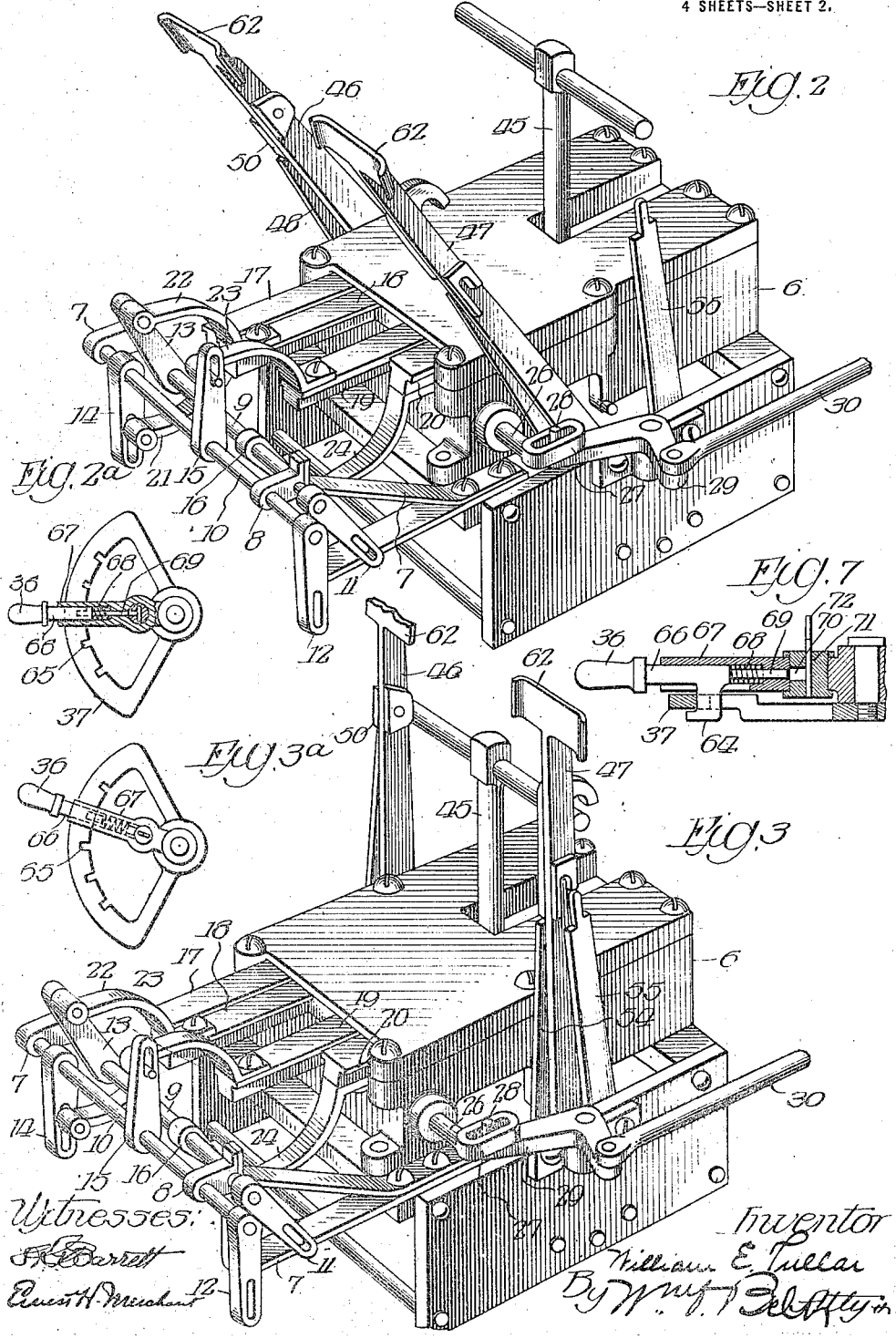

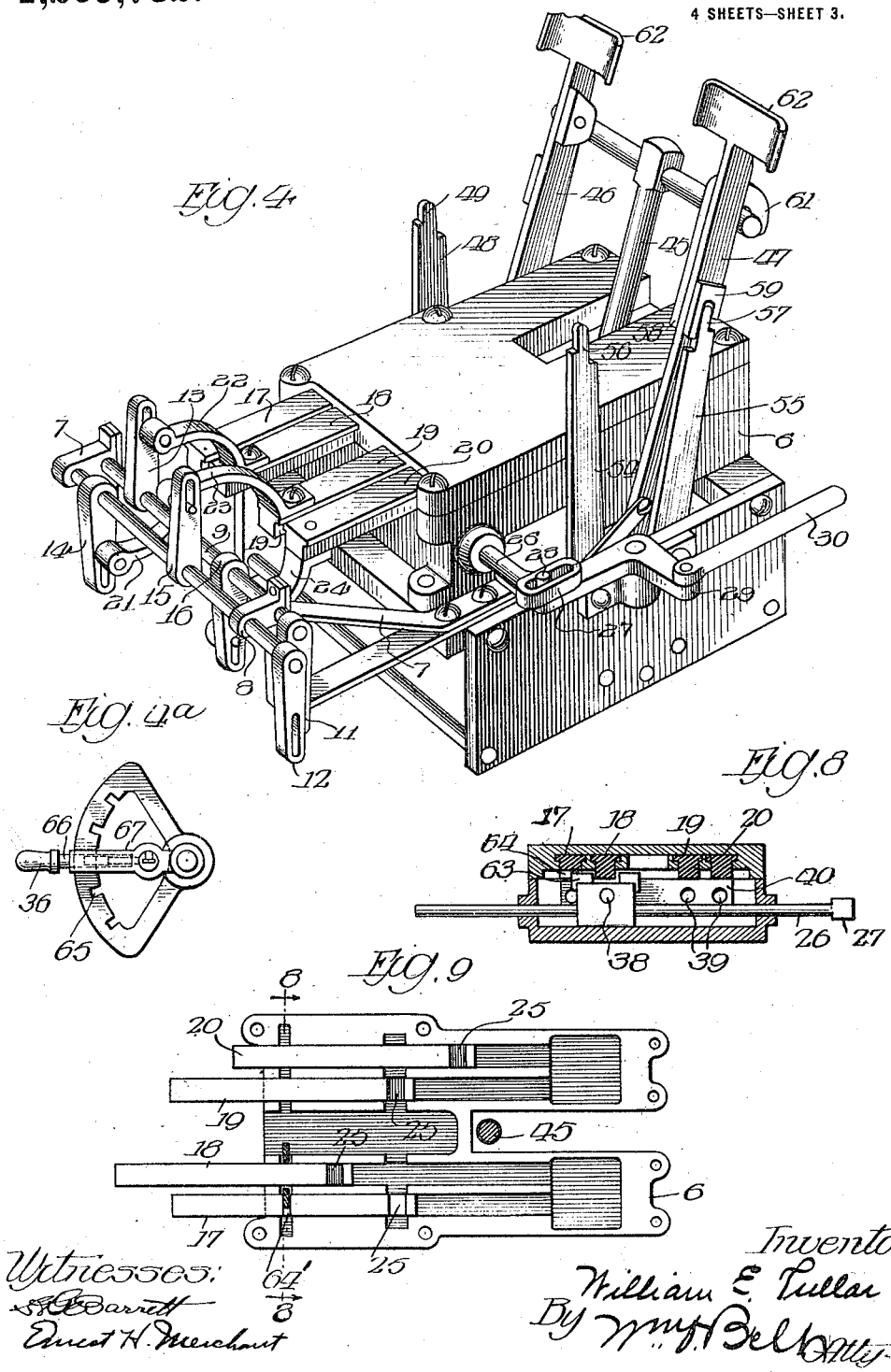

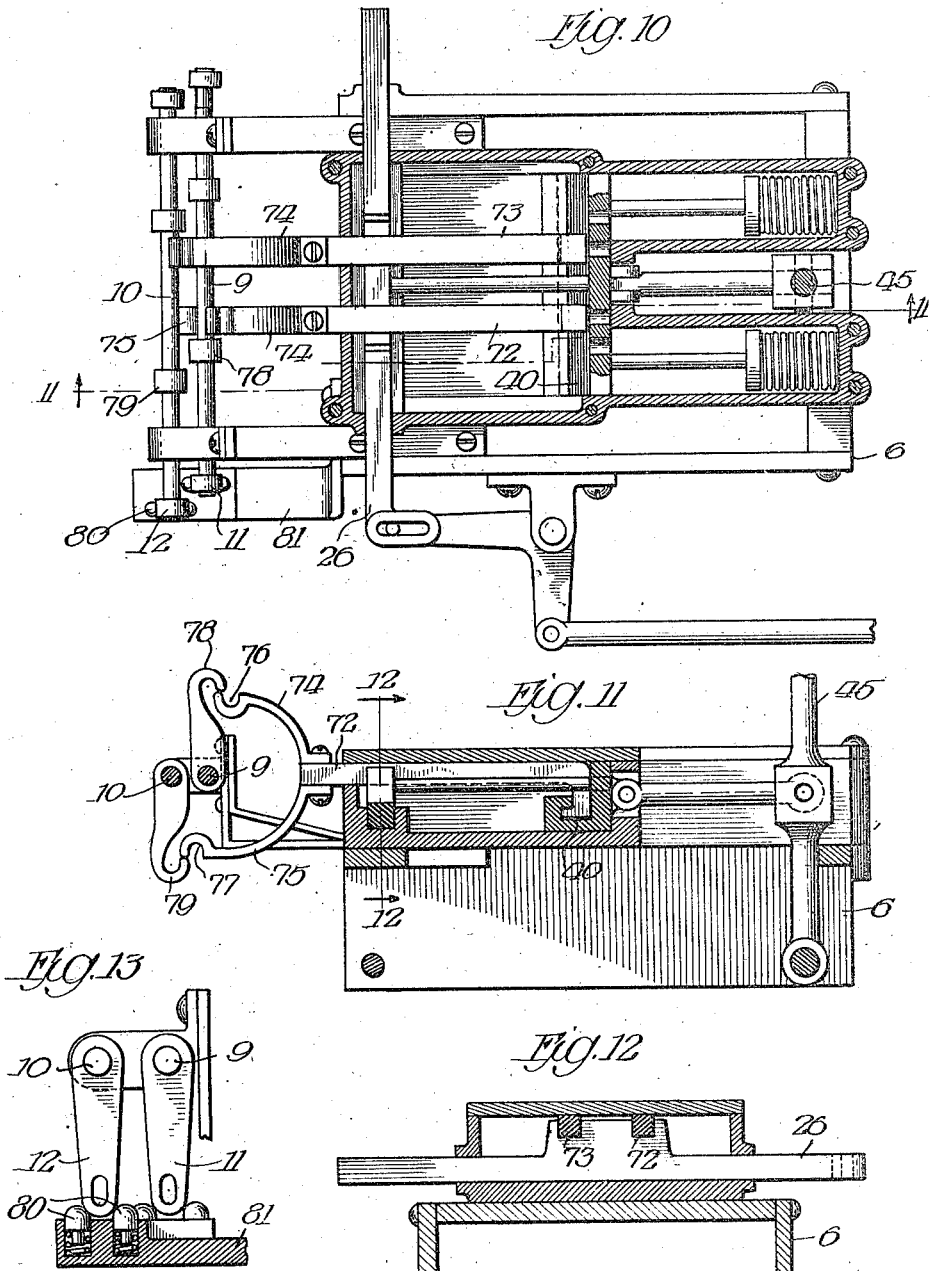

UNITED STATES PATENT OFFICE.

WILLIAM E. TULLAR, OF CHICAGO, ILLINOIS.

CONTROLLING MEANS FOR MOTOR-DRIVEN VEHICLES.

1,209,782.   Specification of Letters Patent.   Patented Dec. 26, 1916.

Application filed September 28, 1914. Serial No. 863,966.

*To all whom it may concern:*

Be it known that I, WILLIAM E. TULLAR, a citizen of the United States, residing at Chicago, in the county of Cook and State of Illinois, have invented certain new and useful Improvements in Controlling Means for Motor-Driven Vehicles, of which the following is a specification.

My invention relates in general to controlling means for motor driven vehicles and more specifically to a controlling means for the speed changing and brake mechanisms in such vehicles.

Heretofore it has been customary to provide motor driven vehicles with a plurality of hand levers and foot pedals. Generally two hand levers are provided one for operating the speed changing mechanism and one for controlling the emergency brake. These levers have been so placed as to interfere with easy access to the driver's seat and to require the driver to shift his position in order to operate the same. These and other objections have made it desirable to discover a controlling means without the objectionable hand levers.

It is an object, therefore, of my invention to provide a controlling means for motor-driven vehicles in which pedals are substituted for the previously necessary hand levers without increasing the number of pedals heretofore used.

A further object of my invention is the provision of a controlling means composed of a minimum number of relatively simple parts the operation of which necessitates the minimum movement of the driver from the position assumed in steering the vehicle.

A still further object of my invention is the provision of means for securely locking the machine so that it can not be used by unauthorized persons.

Other objects and advantages of my invention will be apparent as it is better understood by reference to the following specification when read in connection with the accompanying drawings in which—

Figure 1 is a vertical section through a portion of a motor-driven vehicle, showing my invention mounted therein; Fig. 2 is a perspective view of the controlling mechanism with the operating levers in running position; Fig. 3 is a perspective view of the controlling mechanism with the operating levers in their respective positions to release the clutch and set the reverse brakes; Fig. 4 is a perspective view of the controlling mechanism with the operating levers in their respective position to release the speed changing mechanism and set the emergency brake; Fig. 2ª is a plan view of the speed selector lever and its quadrant with the lever in running position corresponding to Fig. 2, the lever being in section; Fig. 3ª is a similar view with the lever in position corresponding to Fig. 3; Fig. 4ª is a similar view with the lever in neutral position corresponding to Fig. 4; Fig. 5 is a detail showing the locking means for the pedals; Fig. 6 is a plan view of the casing with the cover removed showing the speed selecting mechanism with the connecting rods broken away; Fig. 7 is a detail partially in section of the speed selector lever; Fig. 8 is a section on the line 8—8 of Fig. 9; Fig. 9 is a plan view of the selecting mechanism looking upward showing the connecting rods; Fig. 10 is a plan view of the speed selector mechanism showing a slightly different form thereof; Fig. 11 is a vertical section through the speed selecting mechanism on the line 11—11 of Fig. 10; Fig. 12 is a vertical section through a portion of the speed selecting mechanism on the line 12—12 of Fig. 11; and Fig. 13 is a detail in section of the locking means for the connecting rod.

My invention is adapted to be used in connection with the mechanism disclosed in my allowed application, Serial No. 681,917, filed March 6, 1912, for clutch transmissions but is not limited to such use since it may obviously be used with other forms of transmission mechanism.

Referring to the drawings, 1 indicates the body of a motor-driven vehicle provided with a floor 2 and a foot board 3. A steering wheel 4 is mounted in the column 5 disposed in proper relation within the body 1. Beneath the floor 2 the casing 6 is secured in any suitable manner to the under frame and is adapted to contain the speed selector mechanism.

Mounted on the casing 6 are the brackets 7 carrying the bearing members 8 for the rock shafts 9 and 10. At the ends of the rock shafts 9 and 10 the arms 11 and 12 are, respectively, secured and are adapted to be connected by means of suitable connecting rods to the speed changing mechanism (not shown). The speed changing mechanism may be of the clutch type disclosed in my allowed application previously referred to or may be of the sliding gear or other suitable type. Secured to the rock shafts 9 and 10 between the brackets 7 and 8 are the arms 13, 16 and 14, 15, respectively. The sliding bars 17, 18, 19 and 20 are mounted in the casing 6, extend beyond the same and are connected through members 21, 22, 23 and 24 and a pin and slot connection with the arms 13, 14, 15 and 16, respectively. Each of the bars 17, 18, 19 and 20 is provided near its end with a slot 25, the purpose of which will presently appear.

The rod 26 is slidably mounted in suitable bearings at one end of the casing 6 and is provided at one end with a slotted member 27 adapted to engage a pin 28 on the bell-crank lever 29 which is in turn actuated through the connecting rod 30 from the members 31 and 32, the latter being preferably disposed within the steering column 5 and operable at its upper end by means of a lever 36 moving over a quadrant 37. By moving the lever 36 in either direction on its quadrant the rod 26 is moved transversely of the casing 6 in its bearings.

The rod 26 has secured thereto a pin 38 which is adapted to engage one of a plurality of openings 39 in the track 40, which is movable longitudinally of the casing and is normally held in its forward position by means of the springs 41 engaging the plungers 42 attached to the track 40. Mounted in the track 40 and slidable longitudinally thereof is a selector element or tooth 43 having an opening therein to accommodate the pin 38 which passes therethrough. The tooth 43 is adapted to slidingly engage the slot 25 in one of the rods 17, 18, 19 and 20, depending on the position of the tooth 43 in the track 40.

Connected to the track 40 is a member 44 extending rearwardly of the casing and operatively engaging a T-shaped lever 45 pivoted in the casing. Secured outside the casing 6 and pivoted thereto are the foot-pedal levers 46 and 47, lever 46 constituting the means for actuating the clutch releasing means and for freeing the speed selector mechanism and lever 47 constituting actuating means for the service and emergency brake operating means. Pivoted at one side of the casing is the lever 48 having an end 49 which engages the member 50 secured to the lever 46, whereby the lever 48 is held in operative relation with the lever 46 until the former has been moved to the position indicated in Fig. 4 when the lever 48 is automatically dropped by the lever 46 and is held in the position indicated by means of a bell-crank lever 50 (see Fig. 5) pivoted to the casing 6 and connected to the lever 46 by means of a link 51 through a pin and slot connection 52. It will be apparent that as the lever 46 is moved forwardly, carrying the lever 48, it will turn the bell-crank lever 50 about its axis through the medium of link 51, the arm 53 of the bell-crank lever 50 engaging the lever 48 and holding it against rearward movement until released by the rearward movement of the lever 46. The lever 48 is adapted to be connected in any suitable manner with the clutch (not shown). Upon the opposite side of the casing 6 two levers 54 and 55 are pivotally mounted. These levers are adapted to be connected in any suitable manner to the service and emergency brakes, respectively, and act as operating levers therefor. Each of the levers 54 and 55 are provided with ends 56 and 57 which are adapted to be interengaged with the members 58 and 59, respectively, mounted on the lever 47, during a portion of the travel of this lever. Suitable locking means, such as a bell-crank lever 50 connected by a link 51 to the lever 45, is provided and adapted to lock the lever 54, and hence the service brake, in the set position indicated in Fig. 4 when lever 54 is no longer interengaged with the lever 47. The lever 47 is provided near its upper end with suitable means, such as the hook-shaped member 61, for interengaging during a portion of the travel of the lever 47 with the T-shaped lever 45, the lever 45 being moved rearwardly by either of the levers 46 or 47 to unlock the selector mechanism which may then be moved to selecting position by operating the lever 36. Both of the levers 46 and 47 may be provided with suitable pedals 62.

In order to prevent the movement of any of the bars 17, 18, 19 and 20, other than the one selected, I have provided the sliding rod 26 with the members 63 extending on either side of the pin 38, which members are adapted to engage with notches 64' in the under side of the bars 17, 18, 19 and 20. The members 63 are spaced apart on the rod 26 a sufficient distance to engage and hold the rods 18 and 19 when the pin 38 is in its central or neutral position, and it will be readily understood that since the rods 18 and 19 are connected to the shafts 9 and 10, respectively, and the rods 17 and 20 are similarly connected thereto, when the members 63 are in neutral position all of the rods will be held against movement. When, however, the members 63 are moved in either direction by the movement of rod 26 to a selecting position one of the rods 17, 18, 19 or 20 will be engaged thereby while the adjacent rod is free for movement.

The lever 36 which is pivoted on the quadrant 37, adapted to be mounted on the steering column, is provided with a hook-shaped member 64 adapted to engage the notches 65 in the quadrant 37. The lever 36 comprises a member 66 inclosed within a cylindrical casing 67 and a spring 68 is mounted within the cylinder and bears against shoulders on the portion 66 and the casing 67. A pin 69 extends through the cylindrical portion 67 and is adapted to enter an opening 70 in a lock cylinder 71 mounted in the cylindrical casing 67. The lock cylinder 71 is adapted to be turned by means of a key 72 and may be provided with suitable tumblers (not shown), as is well known in the art, to prevent the turning of the cylinder except by the proper key. When the cylinder is disposed in the relation shown in Fig. 7 the portion 66 of the lever 36 may be forced rearwardly to disengage the member 64 from the notch with which it is engaged, whereupon the lever may be turned about the quadrant. When, however, the cylinder is turned so that the opening 70 is displaced from the position indicated in Fig. 7 it is impossible to move the lever about the quadrant and the selecting mechanism is, therefore, securely locked.

The operation of my device will, it is believed, be apparent without further description. The vehicle being at rest with the levers in the position indicated in Fig. 2, the brakes are released and the clutch engaged. The lever 36 on the steering column is in neutral position and hence the selector mechanism within the casing 6 is in a similar position with each of the rods 17, 18, 19 and 20 held by members 63 against movement. To start the vehicle the lever 46 is moved forwardly carrying the lever 48 which releases the clutch. The lever 48 is moved to the position indicated in Fig. 4 and is locked in this position while the lever 46 engages the T-shaped lever 45 and moves it to its rearmost position, thereby moving the member 44 and the track 40 rearwardly of the casing to free the pin 38 from the holes 39 therein. As soon as the pin 38 has been freed the lever 36 may be moved in either direction on the quadrant and a corresponding movement of the selector element 43 into engagement with one of the notches 25 results. This movement further releases the rod which is engaged by the selector element 43 from the member 63 and locks the remaining rods from movement. Upon releasing the lever 46 it is forced forwardly by the springs 41 in the casing 6, the pin 38 entering one of the openings 39, thus locking the selector mechanism. The rod which is engaged by the selector element 43 is carried forward by the springs 41 and sets the speed-changing mechanism. The lever 46 then releases the lever 48, which interengages therewith, and both levers move forwardly to allow the clutch to be engaged. Assuming that the lever 36 has been moved to the position corresponding to the lowest speed, in order to increase the speed, the operation just described is repeated and the lever 36 moved into the succeeding notch. It is to be noted, of course, that the levers 11 and 12 on the shafts 9 and 10 are connected by suitable means to a speed-changing mechanism which may be of any ordinary form and which is not included in my present invention, the operation of such speed-changing mechanism by means of levers similar to those shown at 11 and 12 on the drawing being well-known in the art.

When it becomes necessary to stop the vehicle the lever 47 is moved rearwardly carrying the lever 54 to the position indicated in Fig. 4 where it is dropped and locked in position. The lever 55, which has been resting in the position indicated in Fig. 2 is then picked up by the lever 47 and moved to the position indicated in Fig. 4. The levers 54 and 55 are adapted to be connected in any suitable manner with the brake mechanism (not shown) and constitute the operating means for the brakes, 54 being the service brake operating means and 55 the emergency brake operating means. As the lever 47 moves rearwardly it engages the T-shaped lever 45 and interlocks therewith through the medium of the member 61. In moving the lever 45 rearwardly the selector mechanism is unlocked and the lever 36 may be moved to neutral position. When the lever 36 has been moved to neutral position the lever 45 is prevented from returning and through the interengagement of the lever 47 therewith and the lock which prevents movement of the lever 36 from neutral position it will be readily seen that the brakes may be held securely in set position and all movement of the vehicle prevented.

In Figs. 10 to 13 of the drawings I have indicated a slightly different form of my invention in which two rods 72 and 73 are substituted for the rods 17, 18, 19 and 20, as previously described. The rods 72 and 73 slidably engage the track 40 at one end and are movable transversely of the casing by means of a rod 26 connected to the operating means on the steering column exactly as previously explained. Each of the rods 72 and 73 is provided at its end with the arms 74 and 75 having hook-shaped ends 76 and 77 adapted to engage similar members 78 and 79 fixed to the shafts 9 and 10. The operating mechanism, other than as noted, is identical with that previously described. The rods 72 and 73 are moved transversely of the casing by means of the rod 26 to engage either of the members 78 and 79, which, as indicated in Fig. 10, are mounted in staggered relation on the shafts 9 and 10. When one of these members 78 or 79 has been engaged and the T-shaped lever 45 is released the springs 41 will force the track 40 forwardly, thereby turning the members 78 or 79 and with it the shaft 9 or 10 about its axis. The shafts 9 and 10 are provided with levers 11 and 12, as previously described, which are connected in a suitable manner to the speed-changing mechanism. In Fig. 13 I have disclosed a locking means for holding the levers 11 and 12 from movement except when actuated by the movement of the rods 72 or 73. This means comprises a pair of spring pins 80 mounted in a bracket 81 disposed beneath the ends of the levers 11 and 12, one of the pins 80 being mounted on either side of the end of the levers 11 and 12. It will not only be readily understood that the lever 11 or 12 can be forced in either direction past the spring pins 80 but that these pins will hold the levers from movement except when actuated by the rods 72 or 73.

While I have, in describing the embodiment of my invention as disclosed in Figs. 10 to 13, stated that the rods 72 and 73 are movable transversely of the casing 6 in order that the members 76 and 77 may engage members 78 and 79 it is obvious that these rods may be so mounted as to be movable only longitudinally of the casing and that the shafts 9 and 10 may by suitable means be moved transversely of the casing in their bearings to engage the members 78 and 79 with the corresponding members 76 and 77.

It will be readily seen that I have provided a controlling device for motor-driven vehicles which has many advantages over the devices of the prior art. In my device hand levers, except that mounted on the steering column, are eliminated. Shifting of gears or other speed-changing devices is absolutely prevented until the clutch is released since the speed selector mechanism cannot be unlocked until the actuating lever has moved past the clutch releasing position. I have provided a single means for operating the service and emergency brakes successively and it will be apparent that it is impossible to use the emergency brake until the service brake is set. Moreover, quicker brake action is possible because both brakes are set by the movement of a single lever. Finally I have provided means for locking the selector mechanism against operation by unauthorized persons but also provide means for locking both brakes in set position when desirable so that all movement of the vehicle is prevented.

It will be understood that various changes in the details of construction and the arrangement of the parts may be resorted to without departing from the spirit or scope of the invention, or sacrificing any of its benefits, the forms herein disclosed being merely preferred embodiments thereof.

I claim:

1. In a device of the character described, the combination of means for operating a service brake, means for operating an emergency brake, and a single means for successively actuating said operating means.

2. In a device of the character described, the combination of a service brake operating lever, an emergency brake operating lever, and a single means for successively actuating said levers.

3. In a device of the character described, the combination of a service brake operating lever, an emergency brake operating lever, and a single lever adapted to successively actuate said operating lever.

4. In a device of the character described, the combination of a service brake operating lever, an emergency brake operating lever, a single lever adapted to successively actuate said operating levers, and means on each of said operating levers adapted to be interengaged with said actuating lever during a part of the movement thereof.

5. In a device of the character described, the combination of means for operating a service brake, means for operating an emergency brake, a single means for successively actuating said operating means, and means for locking said service brake operating means in set position.

6. In a device of the character described, the combination of means for operating a service brake, means for operating an emergency brake, a single means for successively actuating said operating means, and means for locking said actuating means in set position.

7. In a device of the character described, the combination of a service brake operating lever, an emergency brake operating lever, a single lever adapted to successively actuate said operating levers, means on each of said operating levers adapted to be interengaged with said actuating lever during a part of the movement thereof, and means for locking said service brake operating lever when it is disengaged from said actuating lever.

8. In a device of the character described, the combination of a support, a service brake operating lever, an emergency brake operating lever, a single lever adapted to successively actuate said operating levers, means on each of said operating levers adapted to be interengaged with said actuating lever during a part of the movement thereof, a bell-crank lever pivotally mounted on said support, one arm of said bell-crank lever engaging said service brake operating lever, and means for connecting the other arm of said bell-crank lever with said actuating lever, whereby said service brake operating lever is locked when it is disengaged from said actuating lever.

9. In a device of the character described, the combination of a plurality of means for operating a speed-changing mechanism, a selector element adapted to selectively engage and actuate one of said means, means for locking said element, a lever for unlocking said element, service and emergency brake operating means, and an actuating lever therefor, and means for collectively preventing the movement of said unlocking and brake-actuating levers.

10. In a device of the character described, the combination of a plurality of means for operating a speed-changing mechanism, a movable selector element for selectively engaging and actuating one of said means, an operating lever adapted to be mounted on the steering column of a motor-driven vehicle, and means for connecting said lever with said selector element, whereby said selector element may be moved to selecting and neutral positions by said lever, means for locking said selector element in the desired selecting position, a lever for unlocking said element, means for operating service and emergency brakes and a lever for successively actuating said means, means for interlocking said selector element, unlocking and actuating levers, means preventing the return of said unlocking lever when said selector element is moved to neutral position, and means for locking said selector element operating lever in neutral position.

WILLIAM E. TULLAR.

Witnesses:
 WM. O. BELT,
 ERNEST H. MERCHANT.